United States Patent
Berduque et al.

(10) Patent No.: US 11,959,876 B2
(45) Date of Patent: Apr. 16, 2024

(54) RETAINING CAP

(71) Applicant: Analog Devices International Unlimited Company, Limerick (IE)

(72) Inventors: Alfonso Berduque, Crusheen (IE); Donal McAuliffe, Raheen (IE); Brendan Cawley, Patrickswell (IE); Raymond J. Speer, Dalkey (IE); Youri Ponomarev, Rotselaar (BE)

(73) Assignee: Analog Devices International Unlimited Company, Limerick (IE)

( * ) Notice: Subject to any disclaimer, the term of this patent is extended or adjusted under 35 U.S.C. 154(b) by 91 days.

(21) Appl. No.: 17/314,307

(22) Filed: May 7, 2021

(65) Prior Publication Data

US 2021/0262973 A1    Aug. 26, 2021

Related U.S. Application Data

(62) Division of application No. 15/888,863, filed on Feb. 5, 2018, now Pat. No. 11,022,579.

(51) Int. Cl.
*G01N 27/403* (2006.01)
*G01N 27/28* (2006.01)
*G01N 27/404* (2006.01)

(52) U.S. Cl.
CPC .......... *G01N 27/403* (2013.01); *G01N 27/28* (2013.01); *G01N 27/4045* (2013.01)

(58) Field of Classification Search
CPC ... G01N 27/403; G01N 27/28; G01N 27/4045
See application file for complete search history.

(56) References Cited

U.S. PATENT DOCUMENTS

| | | | |
|---|---|---|---|
| 3,942,517 A | | 3/1976 | Bowles |
| 4,014,345 A | | 3/1977 | Kameny |
| 4,102,331 A | * | 7/1978 | Grayzel ................. A61B 5/25 |
| | | | 600/385 |
| 4,132,616 A | | 1/1979 | Tantram et al. |
| (Continued) | | | |

FOREIGN PATENT DOCUMENTS

| | | |
|---|---|---|
| CN | 102466654 B | 3/2014 |
| CN | 103663362 A | 3/2014 |
| (Continued) | | |

OTHER PUBLICATIONS

"U.S. Appl. No. 14/879,738, Advisory Action dated Oct. 10, 2018", 3 pgs.

(Continued)

*Primary Examiner* — Caitlyn Mingyun Sun
(74) *Attorney, Agent, or Firm* — Schwegman Lundberg & Woessner, P.A.

(57) ABSTRACT

A cap for use with devices, such as sensors. The cap includes protrusions on its underside, to restrict the movement of a liquid or a gel placed under cap. The protrusions may take the form of walls or pillars, depending on the application. As such, the cap retains the liquid or gel in a specified position on the device. For example, an electrochemical sensor may require a liquid electrolyte to remain in place over one or more electrodes. The protrusions may not extend far enough to touch the device, but rather leave a small gap. However, because of the surface tension of the liquid, the liquid generally stays within the protrusions.

17 Claims, 13 Drawing Sheets

(56) References Cited

U.S. PATENT DOCUMENTS

| | | | |
|---|---|---|---|
| 4,169,779 A | 10/1979 | Tataria et al. |
| 4,184,937 A | 1/1980 | Tataria et al. |
| 4,474,648 A | 10/1984 | Tantram et al. |
| 4,492,622 A | 1/1985 | Kuypers |
| 4,595,486 A | 6/1986 | Schmidt et al. |
| 4,739,380 A | 4/1988 | Lauks et al. |
| 4,765,864 A | 8/1988 | Holland et al. |
| 4,784,720 A | 11/1988 | Douglas |
| 4,812,221 A | 3/1989 | Madou et al. |
| 4,855,017 A | 8/1989 | Douglas |
| 4,874,499 A | 10/1989 | Smith et al. |
| 4,874,500 A | 10/1989 | Madou et al. |
| 4,900,405 A | 2/1990 | Otagawa et al. |
| 4,925,544 A | 5/1990 | Goldring |
| 5,149,281 A | 9/1992 | Hills et al. |
| 5,215,643 A | 6/1993 | Kusanagi et al. |
| 5,217,595 A | 6/1993 | Smith et al. |
| 5,284,566 A | 2/1994 | Cuomo et al. |
| 5,304,293 A | 4/1994 | Tierney |
| 5,331,310 A | 7/1994 | Stetter et al. |
| 5,358,619 A | 10/1994 | Suzuki |
| 5,376,255 A | 12/1994 | Gumbrecht et al. |
| 5,378,343 A | 1/1995 | Kounaves et al. |
| 5,501,893 A | 3/1996 | Laermer et al. |
| 5,521,101 A | 5/1996 | Saini et al. |
| 5,575,930 A | 11/1996 | Tietje-girault et al. |
| 5,650,054 A | 7/1997 | Shen et al. |
| 5,746,899 A | 5/1998 | Finbow et al. |
| 6,168,948 B1 | 1/2001 | Anderson et al. |
| 6,265,750 B1 | 7/2001 | Feng et al. |
| 6,509,195 B1 | 1/2003 | De et al. |
| 6,663,756 B2 | 12/2003 | Lee et al. |
| 6,695,959 B2 | 2/2004 | Kiesele |
| 6,853,258 B2 | 2/2005 | Toliver et al. |
| 6,948,352 B2 | 9/2005 | Rabbett et al. |
| 7,077,938 B1 | 7/2006 | Austen et al. |
| 7,279,080 B2 | 10/2007 | Chapples et al. |
| 7,498,266 B2 | 3/2009 | Richter et al. |
| 7,534,333 B2 | 5/2009 | Khalafpour |
| 7,767,068 B2 | 8/2010 | Lauks et al. |
| 8,266,795 B2 | 9/2012 | Wagner |
| 8,535,498 B2 | 9/2013 | Inoue et al. |
| 8,551,322 B2 | 10/2013 | Schoenfisch et al. |
| 8,623,189 B2 | 1/2014 | Eckhardt |
| 8,784,640 B2 | 7/2014 | Coulon et al. |
| 8,795,484 B2 | 8/2014 | Stetter et al. |
| 9,097,652 B2 | 9/2015 | Say |
| 9,458,502 B2 | 10/2016 | Rothberg et al. |
| 9,617,149 B2 | 4/2017 | Lagae et al. |
| 10,620,151 B2 | 4/2020 | Berduque et al. |
| 11,022,579 B2 | 6/2021 | Berduque et al. |
| 11,268,927 B2 | 3/2022 | Berduque et al. |
| 2002/0123048 A1 | 9/2002 | Gau |
| 2002/0187260 A1 | 12/2002 | Sheppard, Jr. et al. |
| 2003/0010808 A1 | 1/2003 | Uhland et al. |
| 2003/0049865 A1 | 3/2003 | Santini, Jr. et al. |
| 2003/0104590 A1 | 6/2003 | Santini, Jr. et al. |
| 2003/0105455 A1 | 6/2003 | Santini, Jr. et al. |
| 2004/0026246 A1 | 2/2004 | Chapples et al. |
| 2004/0034332 A1 | 2/2004 | Uhland |
| 2004/0106914 A1 | 6/2004 | Coppeta et al. |
| 2004/0106953 A1 | 6/2004 | Yomtov et al. |
| 2004/0121486 A1 | 6/2004 | Uhland et al. |
| 2004/0143236 A1 | 7/2004 | Santini, Jr. et al. |
| 2005/0050859 A1 | 3/2005 | Coppeta et al. |
| 2005/0055014 A1 | 3/2005 | Coppeta et al. |
| 2005/0096587 A1 | 5/2005 | Santini et al. |
| 2005/0145330 A1 | 7/2005 | Shubinsky et al. |
| 2006/0057737 A1 | 3/2006 | Santini, Jr. et al. |
| 2006/0076236 A1 | 4/2006 | Shah et al. |
| 2006/0100608 A1 | 5/2006 | Uhland et al. |
| 2006/0105275 A1 | 5/2006 | Maloney et al. |
| 2006/0115323 A1 | 6/2006 | Coppeta et al. |
| 2006/0171888 A1 | 8/2006 | Santini, Jr. et al. |
| 2006/0234042 A1 | 10/2006 | Yang et al. |
| 2007/0036835 A1 | 2/2007 | Coppeta et al. |
| 2007/0187241 A1 | 8/2007 | Herbert |
| 2007/0299385 A1 | 12/2007 | Santini, Jr. et al. |
| 2008/0115361 A1 | 5/2008 | Santini, Jr. et al. |
| 2008/0115559 A1 | 5/2008 | Santini, Jr. et al. |
| 2008/0128285 A1 | 6/2008 | Moon et al. |
| 2008/0168921 A1 | 7/2008 | Uhland et al. |
| 2008/0221557 A1 | 9/2008 | Santini, Jr. |
| 2008/0289962 A1 | 11/2008 | Prohaska et al. |
| 2008/0302659 A1 | 12/2008 | Sheppard, Jr. et al. |
| 2009/0018413 A1 | 1/2009 | Santini, Jr. |
| 2009/0024113 A1 | 1/2009 | Maloney et al. |
| 2009/0030404 A1 | 1/2009 | Uhland |
| 2009/0112188 A1 | 4/2009 | Santini, Jr. et al. |
| 2009/0142386 A1 | 6/2009 | Prescott et al. |
| 2009/0234214 A1 | 9/2009 | Santini, Jr. et al. |
| 2009/0301876 A1 | 12/2009 | Wagner et al. |
| 2010/0042075 A1 | 2/2010 | Santini, Jr. et al. |
| 2010/0126856 A1 | 5/2010 | Wang et al. |
| 2010/0137696 A1 | 6/2010 | Santini, Jr. et al. |
| 2010/0236924 A1 | 9/2010 | Chapples et al. |
| 2012/0130339 A1 | 5/2012 | Farra |
| 2012/0181185 A1 | 7/2012 | Vitushinsky et al. |
| 2013/0126349 A1 | 5/2013 | Zhang |
| 2013/0181760 A1 | 7/2013 | Lin |
| 2014/0062596 A1 | 3/2014 | Glibbery |
| 2014/0202855 A1 | 7/2014 | Merz et al. |
| 2014/0202856 A1 | 7/2014 | Roxhed et al. |
| 2014/0311905 A1* | 10/2014 | Stetter ............... B01J 31/06 |
| | | 502/159 |
| 2015/0001076 A1 | 1/2015 | Porro et al. |
| 2015/0009503 A1 | 1/2015 | Shimoyama et al. |
| 2015/0128715 A1 | 5/2015 | Kamimura et al. |
| 2015/0253276 A1 | 9/2015 | Le Neel et al. |
| 2015/0362451 A1 | 12/2015 | Hunziker et al. |
| 2016/0178565 A1 | 6/2016 | Chapples et al. |
| 2017/0060769 A1 | 3/2017 | Wires et al. |
| 2017/0102355 A1 | 4/2017 | McGuinness et al. |
| 2017/0131228 A1 | 5/2017 | Gehrt et al. |
| 2018/0059044 A1 | 3/2018 | Berduque et al. |
| 2019/0195825 A1 | 6/2019 | Berduque et al. |
| 2019/0242847 A1 | 8/2019 | Berduque et al. |
| 2022/0146449 A1 | 5/2022 | Berduque et al. |

FOREIGN PATENT DOCUMENTS

| | | |
|---|---|---|
| DE | 102009047299 A1 | 7/2011 |
| EP | 0284518 A2 | 9/1988 |
| EP | 0299779 A2 | 1/1989 |
| EP | 0299779 B1 | 6/1995 |
| EP | 0588153 B1 | 12/1996 |
| EP | 0586982 B1 | 7/1998 |
| EP | 1164372 B1 | 3/2010 |
| EP | 1305837 B1 | 11/2010 |
| EP | 2361380 B1 | 2/2015 |
| GB | 2235050 A | 2/1991 |
| GB | 2312753 B | 9/1999 |
| JP | S6488245 A | 4/1989 |
| JP | H03269254 A | 11/1991 |
| JP | H03505785 A | 12/1991 |
| JP | 2000235012 A | 8/2000 |
| JP | 2003194773 A | 7/2003 |
| JP | 2012527600 A | 11/2012 |
| JP | 2013156259 A | 8/2013 |
| KR | 20080050951 A | 6/2008 |
| WO | WO-9015323 A1 | 12/1990 |
| WO | WO-02073177 A2 | 9/2002 |
| WO | WO-2016097304 A1 | 6/2016 |
| WO | WO-2017060769 A1 | 4/2017 |
| WO | WO-2018041834 A3 | 5/2018 |

OTHER PUBLICATIONS

"U.S. Appl. No. 14/879,738, Final Office Action dated Jul. 13, 2018", 17 pgs.

"U.S. Appl. No. 14/879,738, Non Final Office Action dated Nov. 24, 2017", 17 pgs.

(56) References Cited

OTHER PUBLICATIONS

"U.S. Appl. No. 14/879,738, Response filed Apr. 24, 2018 to Non Final Office Action dated Nov. 24, 2017", 11 pgs.
"U.S. Appl. No. 14/879,738, Response filed Aug. 23, 2017 to Restriction Requirement dated Jun. 28, 2017", 7 pgs.
"U.S. Appl. No. 14/879,738, Response filed Sep. 13, 2018 to Final Office Action dated Jul. 13, 2018", 12 pgs.
"U.S. Appl. No. 14/879,738, Restriction Requirement dated Jun. 28, 2017", 10 pgs.
"U.S. Appl. No. 15/251,833, Advisory Action dated Apr. 19, 2019", 5 pgs.
"U.S. Appl. No. 15/251,833, Advisory Action dated Nov. 20, 2019", 10 pgs.
"U.S. Appl. No. 15/251,833, Examiner Interview Summary dated Mar. 13, 2019", 3 pgs.
"U.S. Appl. No. 15/251,833, Examiner Interview Summary dated Nov. 25, 2019", 3 pgs.
"U.S. Appl. No. 15/251,833, Final Office Action dated Jan. 10, 2019", 12 pgs.
"U.S. Appl. No. 15/251,833, Final Office Action dated Sep. 5, 2019", 11 pgs.
"U.S. Appl. No. 15/251,833, Non Final Office Action dated May 30, 2018", 15 pgs.
"U.S. Appl. No. 15/251,833, Non Final Office Action dated Jun. 6, 2019", 13 pgs.
"U.S. Appl. No. 15/251,833, Notice of Allowance dated Dec. 16, 2019", 8 pgs.
"U.S. Appl. No. 15/251,833, Response filed Oct. 30, 2019 to Final Office Action dated Sep. 5, 2019", 10 pgs.
"U.S. Appl. No. 15/251,833, Response filed May 9, 2019 to Advisory Action dated Apr. 19, 2019", 11 pgs.
"U.S. Appl. No. 15/251,833, Response filed May 15, 2018 to Restriction Requirement dated Mar. 16, 2018", 6 pgs.
"U.S. Appl. No. 15/251,833, Response filed Aug. 26, 2019 to Non-Final Office Action dated Jun. 6, 2019", 9 pgs.
"U.S. Appl. No. 15/251,833, Response filed Aug. 30, 2018 to Non Final Office Action dated May 30, 2018", 10 pgs.
"U.S. Appl. No. 15/251,833, Restriction Requirement dated Mar. 16, 2018", 8 pgs.
"U.S. Appl. No. 15/251,833, Response filed Dec. 5, 2019 to Advisory Action dated Nov. 20, 2019", 9 pgs.
"U.S. Appl. No. 15/888,863, Corrected Notice of Allowability dated Feb. 17, 2021", 3 pgs.
"U.S. Appl. No. 15/888,863, Corrected Notice of Allowability dated Apr. 14, 2021", 2 pgs.
"U.S. Appl. No. 15/888,863, Final Office Action dated Mar. 30, 2020", 24 pgs.
"U.S. Appl. No. 15/888,863, Non Final Office Action dated Sep. 8, 2020", 24 pgs.
"U.S. Appl. No. 15/888,863, Non Final Office Action dated Nov. 26, 2019", 18 pgs.
"U.S. Appl. No. 15/888,863, Notice of Allowance dated Jan. 27, 2021", 10 pgs.
"U.S. Appl. No. 15/888,863, Response filed Feb. 26, 2020 to Non Final Office Action dated Nov. 26, 2019", 12 pgs.
"U.S. Appl. No. 15/888,863, Response filed Jun. 18, 2020 to Final Office Action dated Mar. 30, 2020", 11 pgs.
"U.S. Appl. No. 15/888,863, Response filed Oct. 1, 2019 to Restriction Requirement dated Aug. 1, 2019", 6 pgs.
"U.S. Appl. No. 15/888,863, Response filed Dec. 3, 2020 to Non Final Office Action dated Sep. 8, 2020", 8 pgs.
"U.S. Appl. No. 15/888,863, Restriction Requirement dated Aug. 1, 2019", 8 pgs.
"U.S. Appl. No. 16/329,664, 312 Amendment filed Dec. 28, 2021", 3 pgs.
"U.S. Appl. No. 16/329,664, Corrected Notice of Allowability dated Jan. 25, 2022", 2 pgs.
"U.S. Appl. No. 16/329,664, Final Office Action dated Jul. 1, 2021", 18 pgs.
"U.S. Appl. No. 16/329,664, Non Final Office Action dated Mar. 15, 2021", 18 pgs.
"U.S. Appl. No. 16/329,664, Notice of Allowance dated Oct. 27, 2021", 9 pgs.
"U.S. Appl. No. 16/329,664, PTO Response to Rule 312 Communication dated Jan. 12, 2022", 2 pgs.
"U.S. Appl. No. 16/329,664, Response filed Jun. 15, 2021 to Non Final Office Action dated Mar. 15, 2021", 9 pgs.
"U.S. Appl. No. 16/329,664, Response filed Sep. 30, 2021 to Final Office Action dated Jul. 1, 2021", 10 pgs.
"U.S. Appl. No. 16/329,664. Preliminary Amendment Filed Feb. 28, 2019", 7 Pgs.
"U.S. Appl. No. 16/329,664. Response filed Feb. 15, 2021 to Restriction Requirement dated Dec. 15, 2020", 7 pgs.
"U.S. Appl. No. 16/329,664. Restriction Requirement dated Dec. 15, 2020", 6 pgs.
"U.S. Appl. No. 15/251,833, Office Action Response filed on Apr. 2, 2019", 10 pgs.
"Chinese Application Serial No. 201690001239.3, Office Action dated Sep. 27, 2018", W/O English Translation, 2 pgs.
"Chinese Application Serial No. 201780061363.8, Office Action dated Jun. 8, 2021", w/ English translation, 26 pgs.
"Chinese Application Serial No. 201780061363.8, Office Action dated Oct. 16, 2020", w/ English Translation, 25 pgs.
"Chinese Application Serial No. 201780061363.8, Response filed Mar. 1, 2021 to Office Action dated Oct. 16, 2020", w/ English claims, 13 pgs.
"Definition of Sensor", Merriam-Webster Dictionary, [Online] Retrieved from the Internet:<URL: https://www.merriam-webster.com/dictionary/sensor>, (Retrieved Aug. 26, 2020), 1 pg.
"European Application Serial No. 17797863.2, Communication pursuant to Article 94(3) EPC dated Jul. 7, 2021", 4 pgs.
"European Application Serial No. 17797863.2, Response filed Aug. 16, 2021 to Communication pursuant to Article 94(3) EPC dated Jul. 7, 2021", 12 pgs.
"Handbook of Chemical and Biological Sensors", Chemical and Biological Sensors book, (Jan. 1996), 1 pg.
"Hydrogen Sulfide 500 HS 4S", Sensor Datasheet H2S 500 HS 4S Rev12-11-15.doc, (Dec. 11, 2015), 2 pgs.
"International Application Serial No. PCT/EP2017/071669, International Search Report dated Apr. 19, 2018", 6 pgs.
"International Application Serial No. PCT/EP2017/071669, Invitation to Pay Add'l Fees and Partial Search Report dated Jan. 17, 2018", 11 pgs.
"International Application Serial No. PCT/EP2017/071669, Written Opinion dated Apr. 19, 2018", 10 pgs.
"International Application Serial No. PCT/EP2019/052262, International Search Report dated Apr. 17, 2019", 4 pgs.
"International Application Serial No. PCT/EP2019/052262, Written Opinion dated Apr. 17, 2019", 5 pgs.
"International Application Serial No. PCT/IB2016/001518, International Search Report dated Mar. 24, 2017", 7 pgs.
"International Application Serial No. PCT/IB2016/001518, Written Opinion dated Mar. 24, 2017", 9 pgs.
"Japanese Application Serial No. 2019-532191, Examiners Decision of Final Refusal dated Sep. 14, 2020", w/ English translation, 6 pgs.
"Japanese Application Serial No. 2019-532191, Office Action dated Mar. 23, 2020", w/ English Translation, 17 pgs.
"Japanese Application Serial No. 2019-532191, Response filed Jan. 13, 2021 to Examiners Decision of Final Refusal dated Sep. 14, 2020", w/ English claims, 8 pgs.
"Japanese Application Serial No. 2019-532191, Response filed Jun. 23, 2020 to Office Action dated Mar. 23, 2020", w/ English Claims, 11 pgs.
"JPH10273329", English translation, (1998), 12 pgs.
et al., "Model: PET bottle 1000ml M1 cylindrical 28/410 45g transparent", Indumel Packaging, Investigation and Development, Product Datasheet Version 3; XP055577515, [Online} Retrieved from the Internet: <URL:https://indumel.pt/wp-content/uploads/pdf/09004l0000%20Ficha%20Tecnica%20-%20Tampa%20dupla%20laranja-laranja%200249-0249.pdf>, (Jul. 24, 2017), 1 pg.

(56) References Cited

OTHER PUBLICATIONS

"Nitrogen Dioxide Micro+ Technical Specification", Sensor Datasheet NO2 100 Micro+, Rev13-02-26.doc, (Feb. 26, 2013), 2 pgs.

Bai, Hua, et al., "Gas sensors based on conducting polymers", Sensors, 7(3), [Online] Retrieved from the internet on Apr. 19, 2016:<URL:http://www.ncbi.nlm.nih.gov/pmc/articles/PMC3756721/#b219sensors0700267>, (Mar. 7, 2007), 1-33.

Berduque, Alfonso, et al., "Electrochemical detection of dopamine using arrays of liquid-liquid micro-interfaces created within micromachined silicon membranes", Analytica Chimica Acta, 611, (2008), 156-162.

Berduque, Alfonso, et al., "Voltammetric characterisation of silicon-based microelectrode arrays and their application to mercury-free stripping voltammetry of copper ions", Talanta, 71, (2007), 1022-1030.

Huang, et al., "Post-CMOS Compatible Microfabrication of a Multi-Analyte Bioelectrochemical Sensor Array Microsystem", IEEE Sensors 2006, EXCO, Daegu, KR, (Oct. 22-25, 2006), 612-615.

Huang, Yue, et al., "Lab-on-CMOS Integration of Microfluidics and Electrochemical Sensors", Proc. of the 6th IEEE Intl. Conference on Nano/Micro Engineered and Molecular Systems, (Feb. 2011), 690-693.

Hung, Wen Tung, et al., "An Electrochemical Gas Sensor for Nitrogen Dioxide based on Pt/Nafion Electrode", Journal of New Materials for Electrochemical Systems, 5, (2002), 305-313.

Ishizu, K, et al., "Carbon dioxide gas sensor with ionic gel", IEEE Transducers & Eurosensors XXVII: The 17th Intl. Conference on Solid-State Sensors, Actuators and Microsystems, (Jun. 2013), 1633-1636.

Joo, Segyeong, "Chemical sensors with integrated electronics", Chem. Rev., 108(2), (2008), 638-651.

Maclay, G. Jordan, et al., "Microfabricated Amperometric Gas Sensors", IEEE Transactions on Electron Devices, vol. 35, No. 6., (Jun. 1988), 793-799.

Madou, Marc, et al., "Electrolytic media for chemical sensors", Solid State Ionics, 28-30, (1988), 1653-1659.

Maseeh, Fariborz, et al., "A Novel Silicon Micro Amperometric Gas Sensor", Proc. of the Intl. Conference on Solid State Sensors and Actuators, Transducers. vol. 91, (1991), 359-362.

Mu, Xiaoyi, et al., "Fabrication of a Minaturized Room Temperature Ionic Liquid Gas Sensor for Human Health and Safety Monitoring", 2012 IEEE Biomedical Circuits and Systems Conference (BioCAS), (2012), 140-143.

Opekar, Frantisek, "Amperometric Solid-State Gas Sensors: Materials for Their Active Components", Critical Reviews in Analytical Chemistry, 32(3), (2002), 253-259.

Scanlon, Micheal D., et al., "Ion-Transfer Eletrochemistry at Arrays of Nanointerfaces Between Immiscible Eletrolyte Solutions Confined within Silicon Nitride Nanopore Membranes", Analytical Chemistry, vol. 82, No. 14, (2010), 6115-6123.

Singh, Virendra V, et al., "Applicatons of Ionic Liquids in Electrochemical Sensors and Biosensors", International Journal of Electrochemistry, (2012), 20 pgs.

Taliercio, T, et al., "Realization of porous silicon membranes for gas sensor applications", Thin Solid Films 255, (1995), 310-312.

Tess, Mark E., et al., "Humidity-independent solid-state amperometric sensor for carbon monoxide based on an electrolyte prepared by Sol-Gel Chemistry", Analytical chemistry, 70(1), (1998), 187-190.

Van Der Wal, P. D., et al., "The development of a Nation based amperometric carbon monoxide sensor for domestic safety", Analusis, 27, No. 4, (1999), 347-351.

Walewyns, Thomas, et al., "Fabrication of a miniaturized ionization gas sensor with polyimide spacer", Conference Paper in Proceedings of SPIE—The International Society for Optical Engineering, (May 2011), 8 pgs.

Wartelle, Corinne, et al., "Novel biocompatible hydrogel-based amperometric sensor for nitric oxide gas detection: towards a non-invasive device", Chem. Commun., 2004, (May 7, 2004), 1302-1303.

White, Rob, "Reducing Risks and the Cost of Gas Detection", IET Mar. / Apr. 2013, (Apr. 2013), 39-40.

Xiong, Linhongjia, et al., "Amperometric Gas detection: A Review", Int. J. Electrochem. Sci., 9, (2014), 7152-7181.

Yan, Heqing, et al., "A solid polymer electrolyte-based electrochemical carbon monoxide sensor", Sensors and Actuators B, 17, (1994), 165-168.

Yasuda, Ayumu, et al., "Electrochemical carbon monoxide sensor with a Nafion(r) film", Reactive & Functional Polymers, 41, (1999), 235-243.

Zazpe, Raul, "Characterisation of Arrays of Micro-Liquid | Liquid Interfaces", Thesis, Tyndall National Institute/University College Cork, (Sep. 2005), 138 pgs.

Zazpe, Raul, et al., "Characterisation of Arrays of Micro-Liquid | Liquid Interfaces", Chapter 1 of PhD Dissertation, Tyndall National Institute/University College, Cork, Ireland, (Sep. 2005), 71 pgs.

Zazpe, Raul, et al., "Ion-transfer voltammetry at silicon membrane-based arrays of micro-liquid-liquid interfaces", Lab Chip, 7, (2007), 1732-1737.

U.S. Appl. No. 14/879,738, filed Oct. 9, 2015, Electrochemical Sensor and a Method of Forming an Electrochemical Sensor.

U.S. Appl. No. 15/251,833 U.S. Pat. No. 10,620,151, filed Aug. 30, 2016, Electrochemical Sensor and a Method of Forming an Electrochemical Sensor.

U.S. Appl. No. 16/329,664 U.S. Pat. No. 11,268,927, filed Feb. 28, 2019, Electrochemical Sensor and a Method of Forming an Electrochemical Sensor.

U.S. Appl. No. 17/585,332, filed Jan. 26, 2022, Electrochemical Sensor and a Method of Forming an Electrochemical Sensor.

U.S. Appl. No. 15/888,863 U.S. Pat. No. 11,022,579, filed Feb. 5, 2018, Retaining Cap.

"European Application Serial No. 17797863.2, Communication Pursuant to Article 94(3) EPC dated Nov. 2, 2022", 4 pgs.

"U.S. Appl. No. 17/585,332, Non Final Office Action dated Sep. 20, 2023", 15 pgs.

"U.S. Appl. No. 17/585,332, Response filed Jul. 12, 2023 to Restriction Requirement dated May 12, 2023", 6 pgs.

* cited by examiner

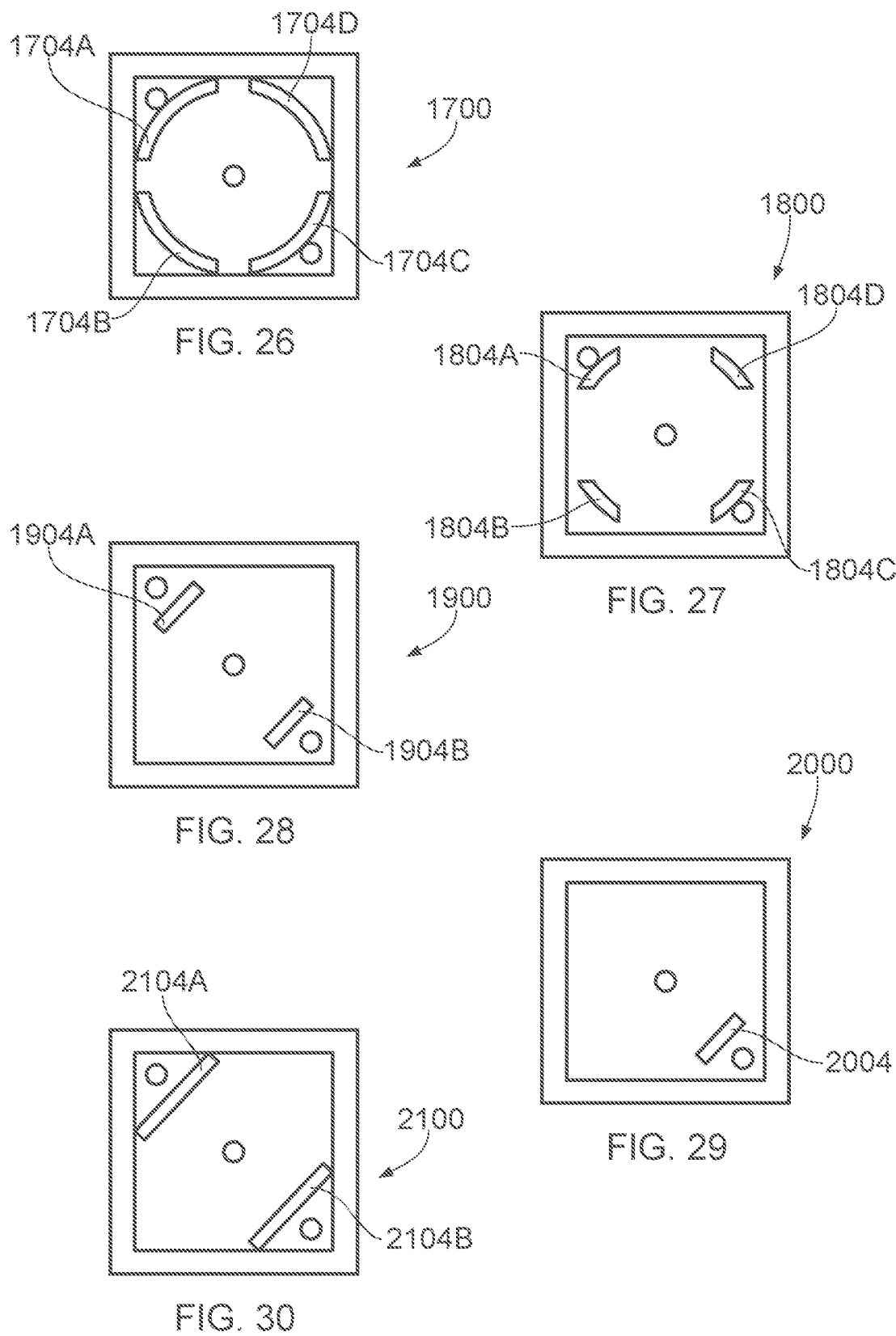

RETAINING CAP

CROSS-REFERENCE TO RELATED APPLICATION

This application is a division of U.S. patent application Ser. No. 15/888,863, filed Feb. 5, 2018, which is incorporated by reference herein in its entirety.

FIELD OF THE DISCLOSURE

This document pertains generally, but not by way of limitation, to a retaining cap such as for a portion of an electronic device, and in particular, the present disclosure relates to a cap for use with discrete or semiconductor-based sensors or devices in which a liquid or gel, such as an electrolyte, forms part of the device.

BACKGROUND

Various types of devices use a liquid or a gel in order to ensure proper operation. For example, electrochemical sensors may include a liquid electrolyte. The liquid electrolyte is formed over one or more electrodes, and contact with those electrodes is important for consistent operation of the device. In order to ensure that the electrolyte remains in place, a cap is placed over the sensor. However, if the cap is not completely filled with electrolyte, which could be the case if the sensor is an electrochemical gas sensor, then dependent on the orientation of the device, the electrolyte may move such that complete coverage of the electrodes is not achieved. Furthermore, over time, electrolytes typically dry out, causing shrinkage. Shrinkage of the electrolyte can also exacerbate these problems. Similar issues may exist with other types of devices such as MEMs devices. Any type of device in which a liquid or a gel is required to be maintained in a particular location may be subject to the problems described above.

In view of the above, there is a need for improved caps which can better retain liquids or gels under a variety of conditions.

SUMMARY OF THE DISCLOSURE

The present disclosure relates to a cap for use with devices, such as sensors. The cap includes protrusions on its underside, to restrict the movement of a liquid or a gel placed under cap. The protrusions may take the form of walls or pillars, depending on the application. As such, the cap retains the liquid or gel in a specified (e.g., predefined) position on the device. For example, an electrochemical sensor may require a liquid electrolyte to remain in place over one or more electrodes. The protrusions may not extend far enough to touch the device, but rather leave a small gap. However, because of the surface tension of the liquid, the liquid generally stays within the protrusions.

In certain embodiments, a cap, for use in discrete or semiconductor-based devices, the cap comprising: a cap structure defining a first recess configured to hold a liquid or a gel when the cap is positioned adjacent a device; a retaining structure, formed in a first surface of the cap structure, configured to restrict the movement of the liquid or gel located under the cap.

In certain embodiments, a device is provided comprising the cap of the previous paragraph.

In certain embodiments a method of manufacturing a device, comprising: providing a substrate having a first specified area; attaching a cap to a first surface of the substrate, the cap covering the first specified area, and having a retaining structure, formed in a first surface of the cap structure, and configured to restrict the movement of a liquid or a gel located under the cap; and inserting a liquid or gel through a first hole formed in the cap; wherein the retaining structure is configured to retain the liquid or gel in alignment with the first specified area.

In certain embodiments an electrochemical sensor, comprising: a substrate; at least one electrode formed on a first surface of the substrate; a cap, attached to the substrate and covering the at least one electrode; a liquid or gel electrolyte, formed within the cap; wherein the cap includes a retaining structure on a side of the cap facing the substrate, and the retaining structure is configured to retain the liquid or gel such that is substantially covers the at least one electrode.

Further features of certain embodiments may be found in the dependent claims.

BRIEF DESCRIPTION OF THE DRAWINGS

The present invention will now be described, by way of example only, with reference to the drawings, in which:

FIG. 26 shows a plan view of the underside of a cap according to a further embodiment of the disclosure;

FIG. 27 shows a plan view of the underside of a cap according to a further embodiment of the disclosure;

FIG. 28 shows a plan view of the underside of a cap according to a further embodiment of the disclosure:

FIG. 29 shows a plan view of the underside of a cap according to a further embodiment of the disclosure; and FIG. 30 shows a plan view of the underside of a cap according to a further embodiment of the disclosure.

DETAILED DESCRIPTION

The present disclosure relates to a cap design which may assist in retaining a liquid or a gel, in discrete or semiconductor devices such as sensors. In various embodiments of this disclosure, the cap is provided with one or more retaining structures on the underside of the cap. Typically, these caps include a peripheral wall, which is traditionally used to maintain a liquid within a recess formed by the peripheral wall. In the present disclosure, a retaining structure is formed within the peripheral wall, on the underside of the cap. For example, the retaining structure may be a cylindrical wall which forms a further recess within the cap. The cylindrical wall has a height which is less than the height of the peripheral wall. When a liquid is introduced into the cap, because of the very small dimensions of the cap, the surface tension of the liquid affects its ability to move within the retaining structure. As such, although the retaining cylindrical structure does not physically prevent the liquid leaving within the cap, the effect of the surface tension of the liquid means that the liquid remains within the retaining structure.

The retaining structure may take the form of one or more linear or arcuate walls formed within the peripheral wall. Further details of these are provided below. Alternatively, the retaining structure may take the form of a large number of pillars formed on the under-surface of the cap. As with the retaining walls, although these pillars do not physically prevent the liquid moving within the cap, the surface tension of the liquid mean that the liquid does in fact remain in place under the cap.

Figure 1:
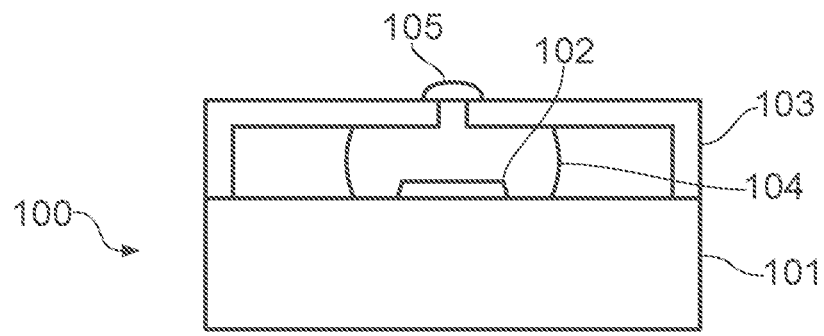
FIG. 1 shows a cross-sectional view of a semiconductor-based sensor.

FIG. 1 shows an example of an electrochemical sensor in which the cap includes no retaining structures. FIG. 1 is a simplified version of an electrochemical sensor, and further details concerning examples of such a sensor may be found in U.S. patent application Ser. No. 15/251,833, which is hereby incorporated by reference herein in its entirety. The electrochemical sensor 100 includes a substrate 101 which includes an electrode 102. In alternative embodiments, the sensor may include a series of electrodes. A cap 103 is placed over the substrate 101 and an electrolyte 104 is formed within the cap. The cap includes a hole which is covered by one or more plugs 105. This is to prevent the electrolyte from escaping. As shown in FIG. 1, owing to the effects of surface tension, the electrolyte "sticks" to the sensor surface and the cap ceiling.

Figure 2:
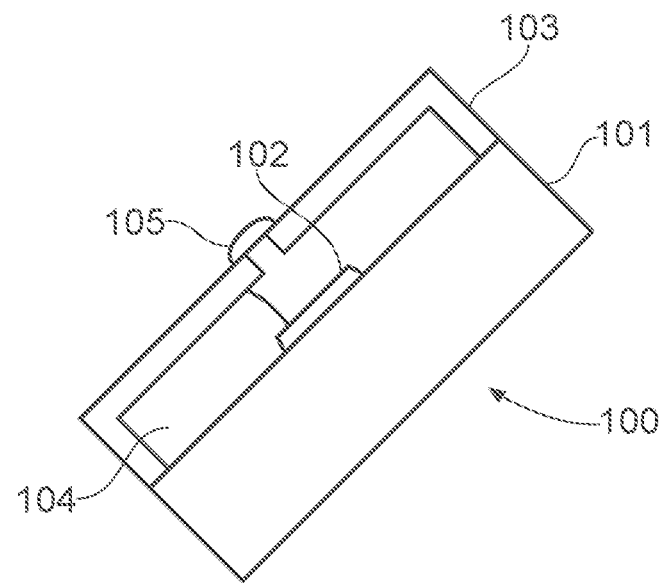
FIG. 2 shows a cross-section view of the sensor of FIG. 1 when orientated on its side.

FIG. 2 shows the sensor 100 of FIG. 1, such that it is partially orientated on its side. Such an orientation may happen in various different applications. As can be seen, owing to the air gap provided within the cap, the electrolyte has moved such that the electrode 102 is not completely covered by the electrolyte. This may cause the device to operate ineffectively.

Figure 3:
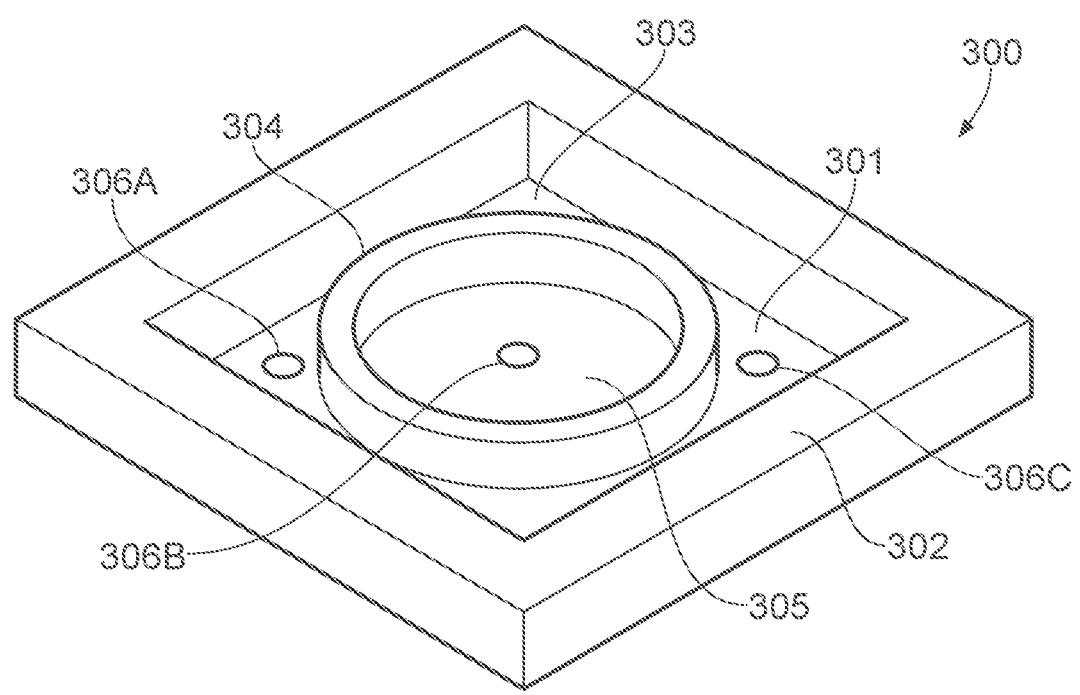
FIG. 3 shows a perspective view of the underside of a cap according to an embodiment of the disclosure.

FIG. 3 shows a cap 300 in accordance with an embodiment of the disclosure. The cap includes a cover 301 and a perimeter wall 302. The cap shown in FIG. 3 may have a length and a width of 4 mm. The perimeter walls may have a width of 0.2 mm. In alternative embodiments, the cap could take others sizes depending on the application. For example, caps measuring 1 mm by 1 mm or 2 mm by 2 mm could be made. The walls may be thinner or thicker than those shown, depending on the application.

In this example, the cover 301 and the perimeter wall 302 are square in shape. However, it will be appreciated that other shapes may be used as dictated by the device in question. The cover 301 and the perimeter wall 302 form a main recess 303. In use, the liquid or the gel will generally be held within this recess. A liquid retaining structure 304 is formed on the underside of the cover 301. In this embodiment, the retaining structure is a cylindrical structure. In particular, it is a circular wall which is formed coaxially with the perimeter wall 302 and has a wall height which is less than the height of the perimeter wall 302. A retention recess 305 is formed within the retaining structure 304.

In this embodiment, three holes are formed in the cover 301. In this example, hole 306A is formed outside of the retaining structure, hole 306B is formed within the retaining structure and coaxially with the retaining structure, and hole 306C is formed on the opposite side of the cover to hold 306A. One of these holes may be for inserting a liquid or a gel during the manufacturing process, and the other holes may be for venting excess liquid or gel during the manufacturing process. As will be discussed in more detail below, different numbers holes may be utilised in different situations. After the device is complete, the holes are plugged.

Figure 4:
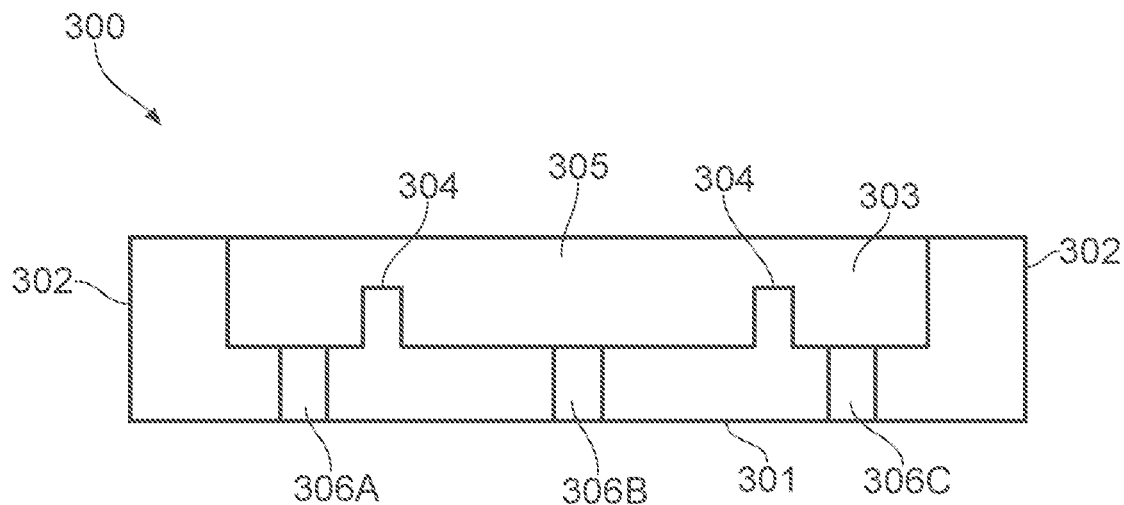
FIG. 4 shows a cross-sectional view of the cap shown in FIG. 3.

FIG. 4 shows a cross-sectional view of cap 300. This Figure clearly shows that the retaining structure 304 has walls of a height substantially less than the height of the perimeter walls 302.

In this example, the perimeter walls have a height extremely of 0.7 mm or approximately 0.7 mm. Within the recess 303, the height is 0.5 mm or approximately 0.5 mm. Each of the dispensing holes may have a diameter of 0.25 mm. The perimeter wall 304 may have a height of 0.3 mm and a width of 0.15 mm. The diameter of the liquid retaining structure may be set as required.

Figure 5:
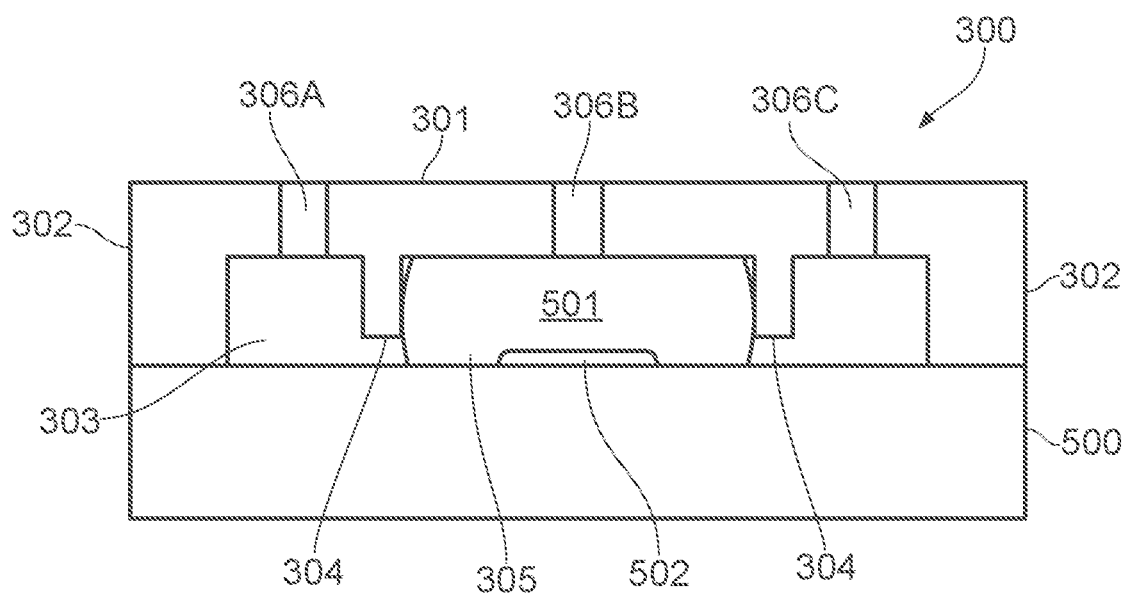
FIG. 5 shows a cross-sectional view of a sensor including the cap of FIG. 4.

FIG. 5 shows a device (which may be an electrochemical sensor) which includes a substrate 500 and the cap 300. In this example, the device includes a liquid electrolyte 501, and an electrode 502. Although gaps are formed between the retaining structure 304 and the substrate 500, owing to the surface tension of the liquid electrolyte 501, the liquid electrolyte remains in place within recess 305, completely covering electrolyte 502.

Figure 6:
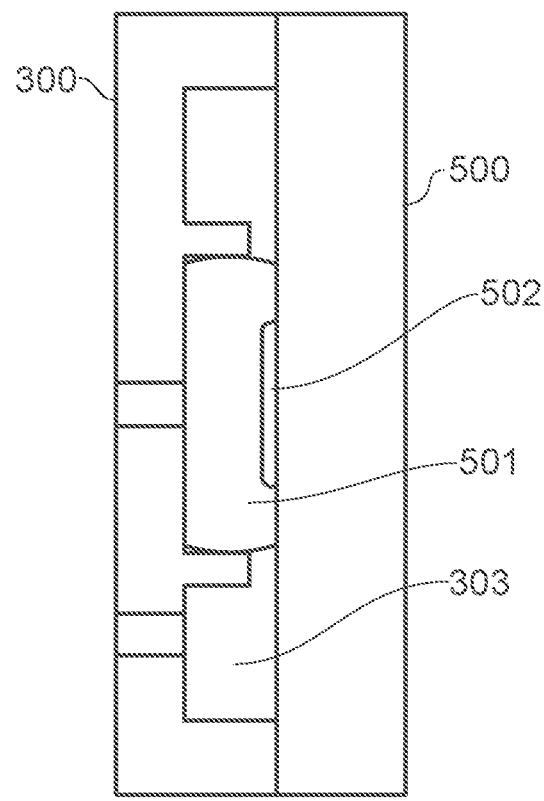
FIG. 6 shows a cross-sectional view of the sensor of FIG. 5 when orientated on its side.
Figure 7:
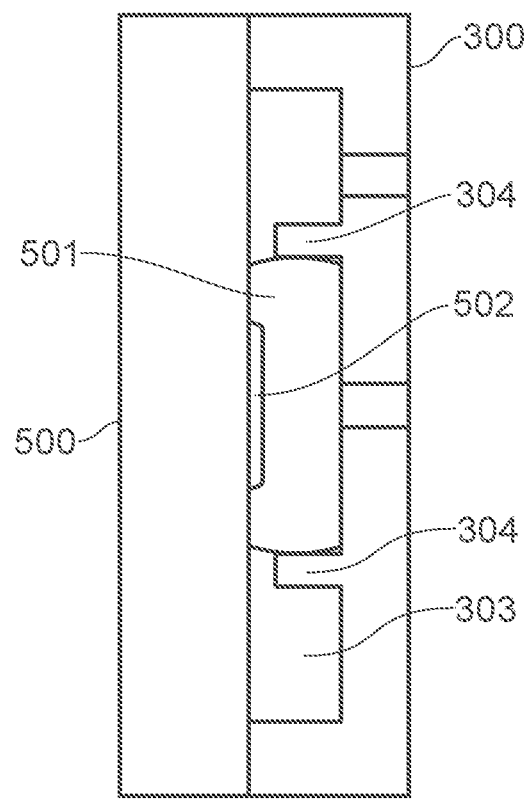
FIG. 7 shows a cross-sectional view of the sensor of FIG. 5 when orientated on the opposing side to that shown in FIG. 6.
Figure 8:
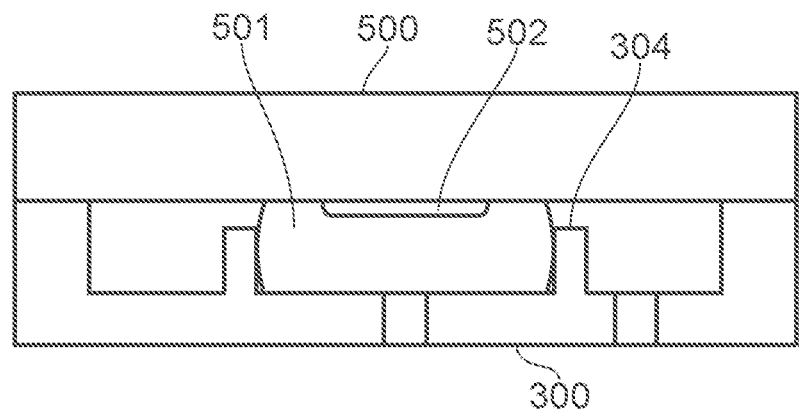
FIG. 8 shows a cross-sectional view of the sensor of FIG. 5 when orientated upside down.

FIGS. 6 and 7 show the same device when the device is oriented on either side. As can be seen, although the forces of gravity should force the electrolyte 501 towards the end of the free space provided within recess 303, the liquid retaining structure 304, combined with the surface tension of the electrolyte 501, prevents the electrolyte from moving. As such, the electrolyte maintains good coverage of the electrode 502. FIG. 8 shows the device when oriented upside-down. As with FIGS. 6 and 7, the liquid electrolyte 501 remains within the liquid retaining structure 304 and maintains good coverage of the electrode 502.

Figure 9:
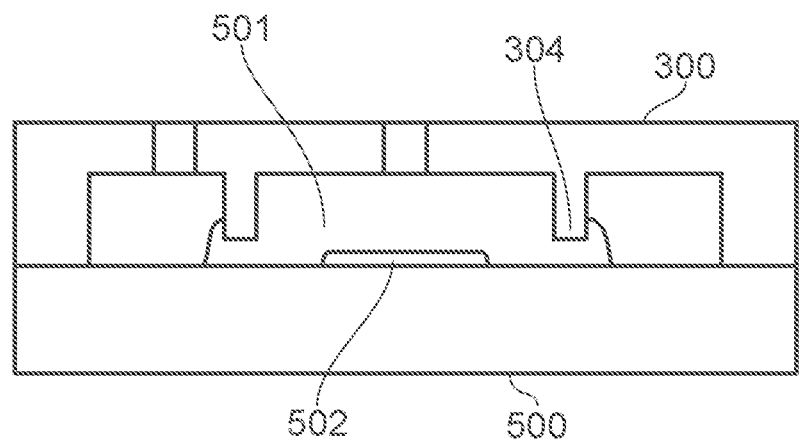
FIG. 9 shows a cross-sectional view of the sensor of FIG. 5 when exposed to high humidity conditions.

FIG. 9 demonstrates the effect of high humidity on the liquid electrolyte. In this example, the liquid electrolyte 501 expands, but generally does so to an equal degree around the edges of the liquid retaining structure 304. As such, the electrolyte 501 retains good coverage of the electrode 502.

Figure 10:
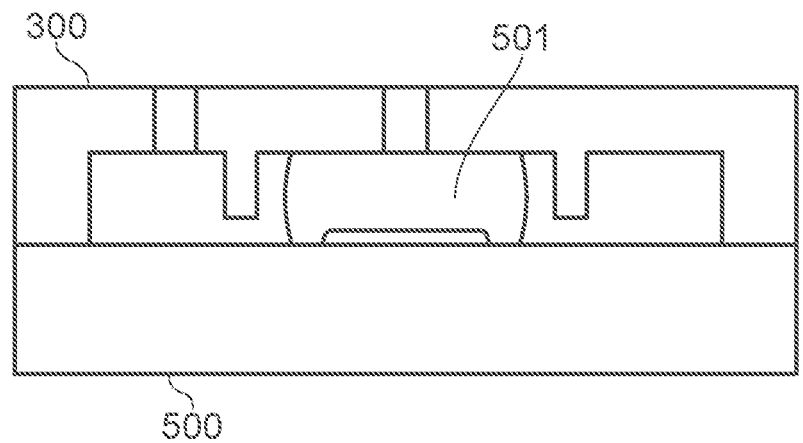
FIG. 10 shows a cross-sectional view of the sensor of FIG. 5 when exposed to low humidity conditions.

FIG. 10 is an example of the effects of low humidity on the electrolyte 501. Here, the electrolyte is caused to shrink. The electrolyte may not remain exactly centred but it would remain within the holding structure 304 thus minimising the negative effects of drying out, i.e. the electrodes would still remain wet.

Figures 11, 12:
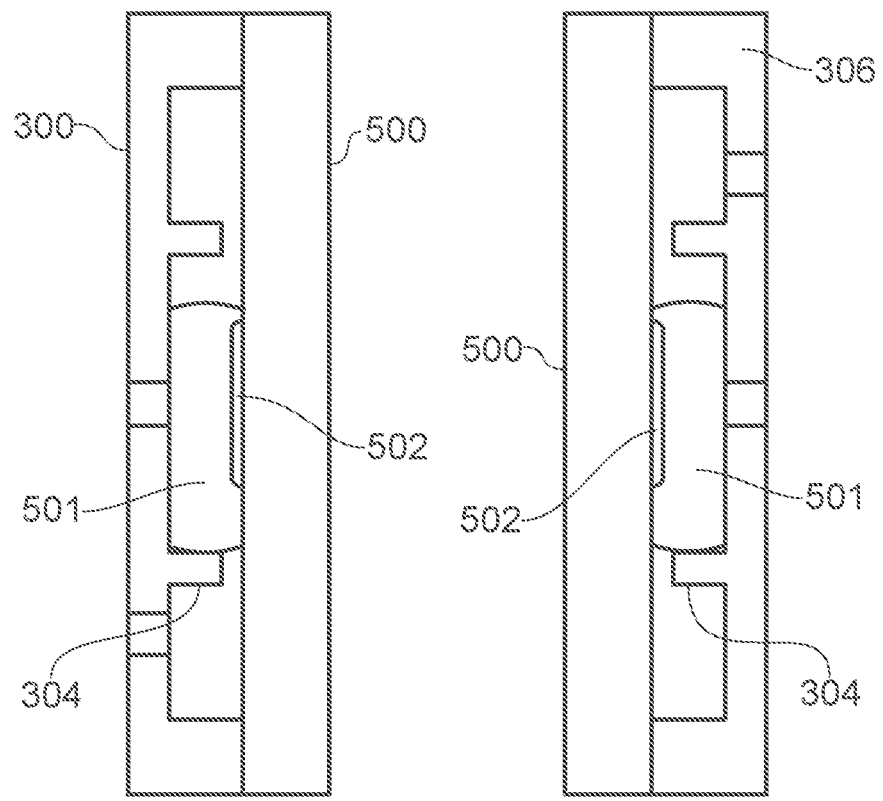
FIG. 11 shows a cross-sectional view of the sensor of FIG. 5 when exposed to low humidity conditions and orientated on its side.
FIG. 12 shows a cross-sectional view of the sensor of FIG. 5 when exposed to low humidity conditions and orientated on the opposing side to that shown in FIG. 11.

FIGS. 11 and 12 show the device oriented on either side during low humidity. As can be seen, although the electrolyte 501 does move within the recess 305, because it is prevented from moving past the retaining structure 304, it maintains good coverage with the electrode 502.

Figure 13:
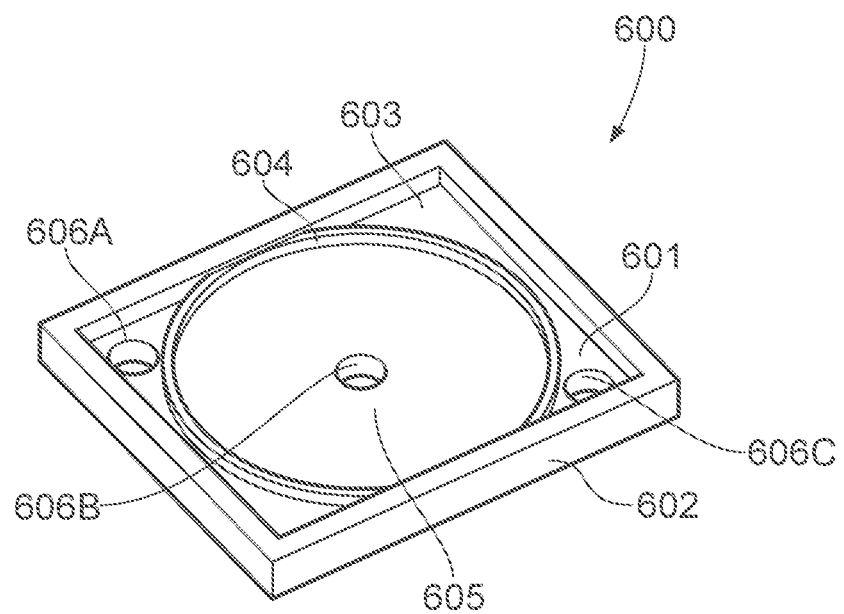
FIG. 13 shows a perspective view of the underside of a cap according to a further embodiment of the disclosure.
Figure 14:
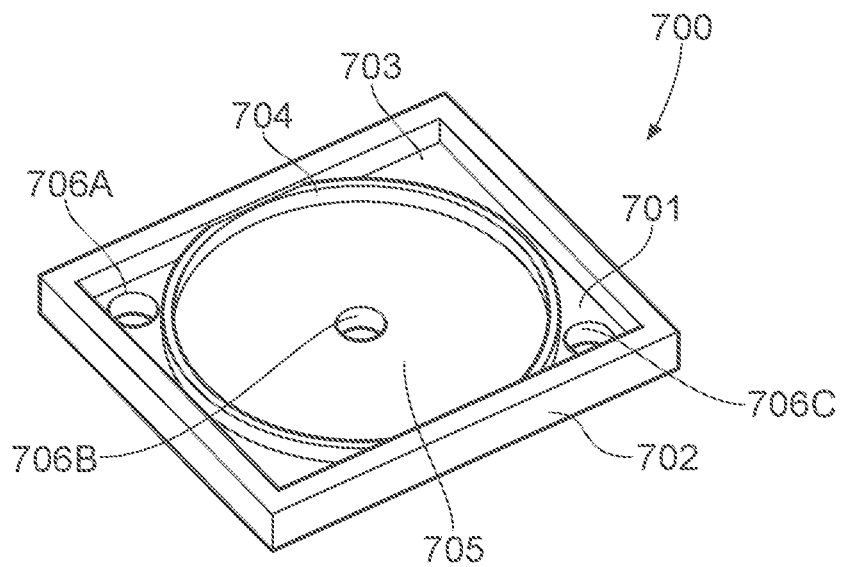
FIG. 14 shows a perspective view of the underside of a cap according to a further embodiment of the disclosure.
Figure 15:
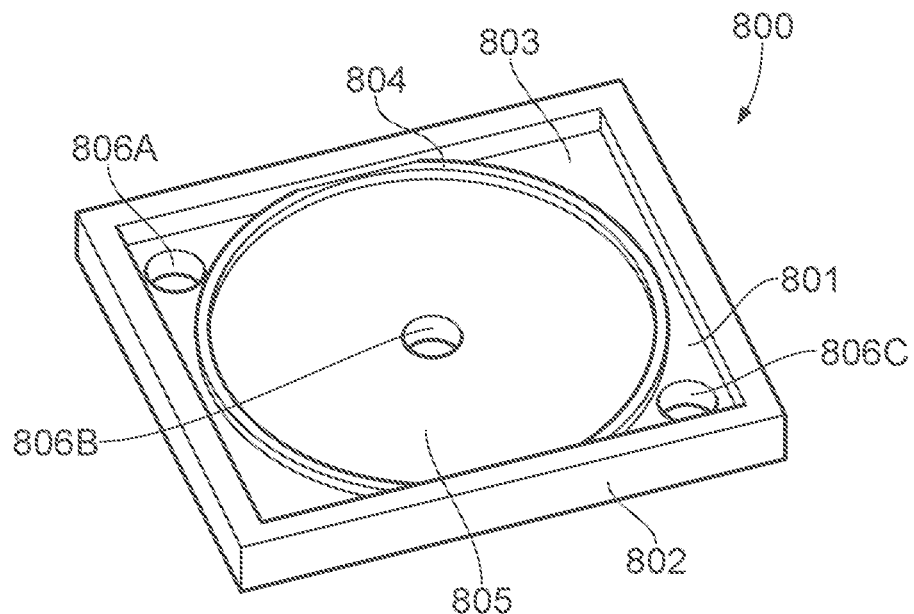
FIG. 15 shows a perspective view of the underside of a cap according to a further embodiment of the disclosure.
Figure 16:
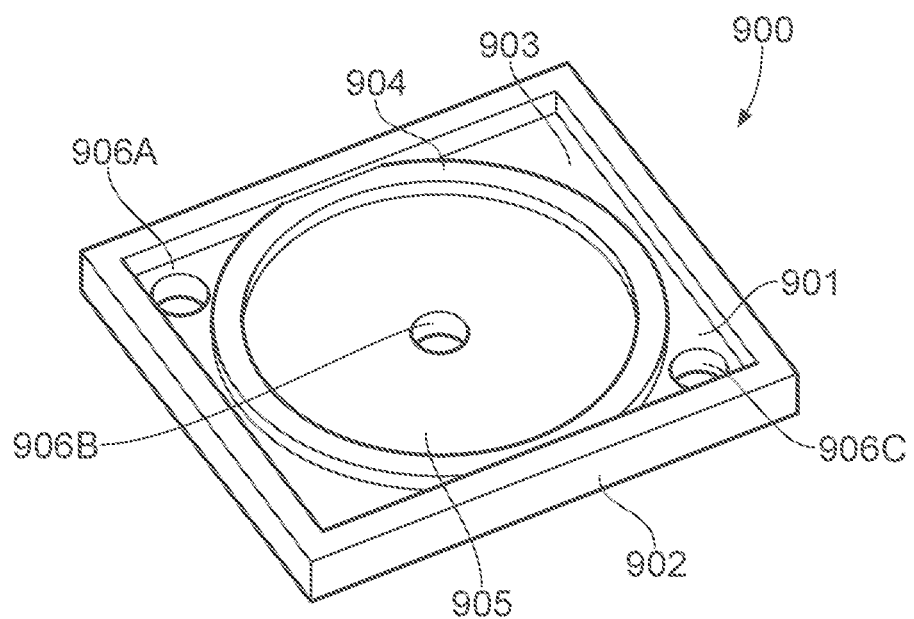
FIG. 16 shows a perspective view of the underside of a cap according to a further embodiment of the disclosure.

FIGS. 13 to 18 show various examples of a cap in accordance with embodiments of this disclosure, in which the perimeter wall and the liquid retaining structure wall height and wall width take different dimensions. In the example shown in FIGS. 13 to 16, various dimensions are common to each design. For example, the cap height may be any height as determined by the particular application. The same applies to the exterior perimeter wall thickness. The depth of recess 303 is typically less than 2 mm, but may be any dimension as required by the particular application. In this example, there are three dispensing/vent holes with a typical diameter of less than 0.5 mm. Furthermore, the internal cylinder diameter and wall thickness is also uniform. In FIG. 13, the liquid retaining structure 604 has a height which is 60% of the recess 603. In FIG. 14, the liquid retaining structure 704 has a height which is 90% of the height of the recess 703. In FIG. 15, the liquid retaining structure 804 has a height which is 10% of the recess 803. It will be appreciated that other liquid retaining structure heights are possible. For example, the retaining structure may be from 5% to 95% of the height of the perimeter wall. The height of the retaining structure wall and the total cap height may need to be optimised depending on the nature of the liquid used (e.g. in terms of viscosity and surface tension). If the internal cap height is increased, the retaining structure height may need to be adjusted. In FIG. 16, the height is the same as in FIG. 13, but a thicker liquid retaining structure 904 wall is provided.

Figure 17:
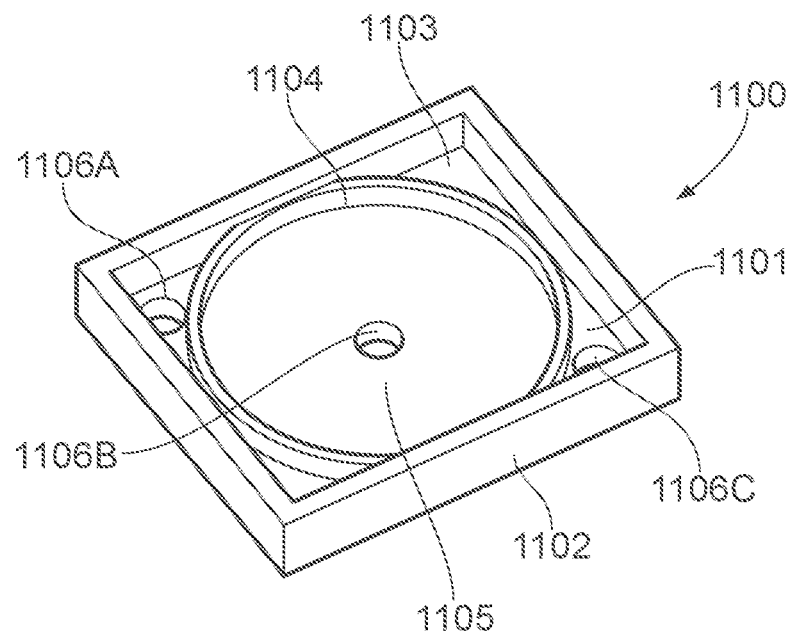
FIG. 17 shows a perspective view of the underside of a cap according to a further embodiment of the disclosure.
Figure 18:
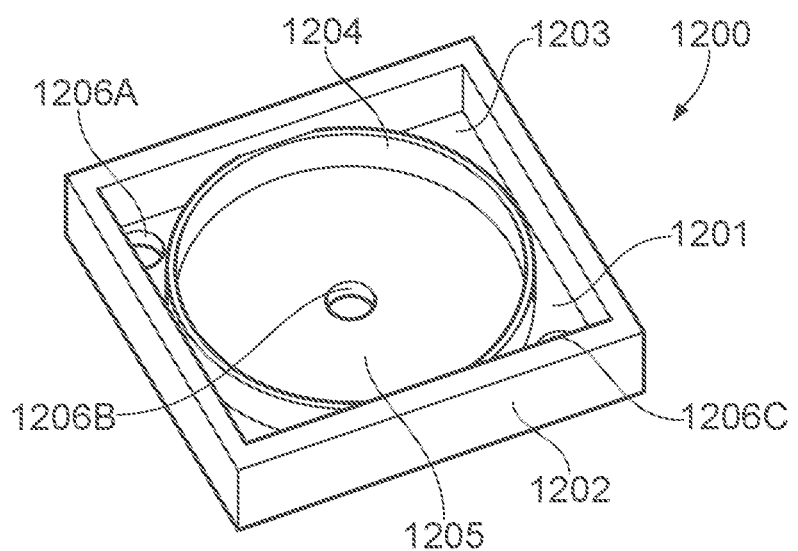
FIG. 18 shows a perspective view of the underside of a cap according to a further embodiment of the disclosure.

FIGS. 17 and 18 show examples of the cap in which the height of the cap, and hence the perimeter wall, are higher than in the previous example. For example, in FIG. 17, the perimeter wall is 1 mm rather than 0.7 mm. In FIG. 18, the perimeter 1202 is 1.5 mm rather than 0.7 mm. In both of these examples, the liquid retaining structure is 60% of the height of the recess 1103 and 1203.

Figure 19:
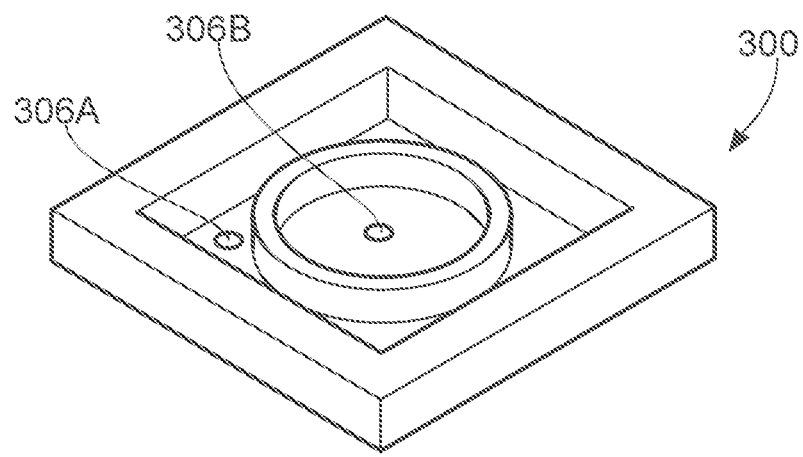
FIG. 19 shows a perspective view of the underside of a cap according to a further embodiment of the disclosure.
Figure 20:
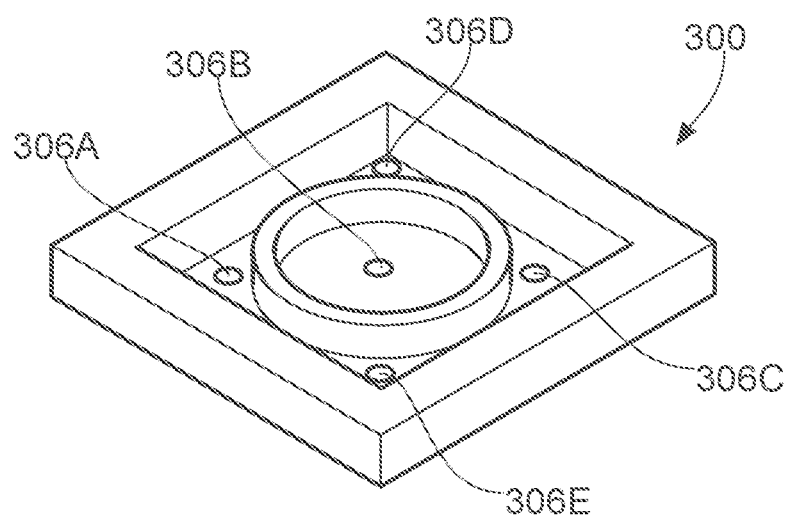
FIG. 20 shows a perspective view of the underside of a cap according to a further embodiment of the disclosure.

FIGS. 19 and 20 show a cap in accordance with the present disclosure, which is the same as the cap shown in FIG. 3 in various respects. However, in FIG. 19, only two holes are provided, whereas in FIG. 20, five holes are provided. A cap having two holes is generally easier to manufacture. However, by using three holes, when the liquid is injected through the middle hole, the air is pushed towards the vent holes in a more uniform or symmetrical manner.

Figure 21:
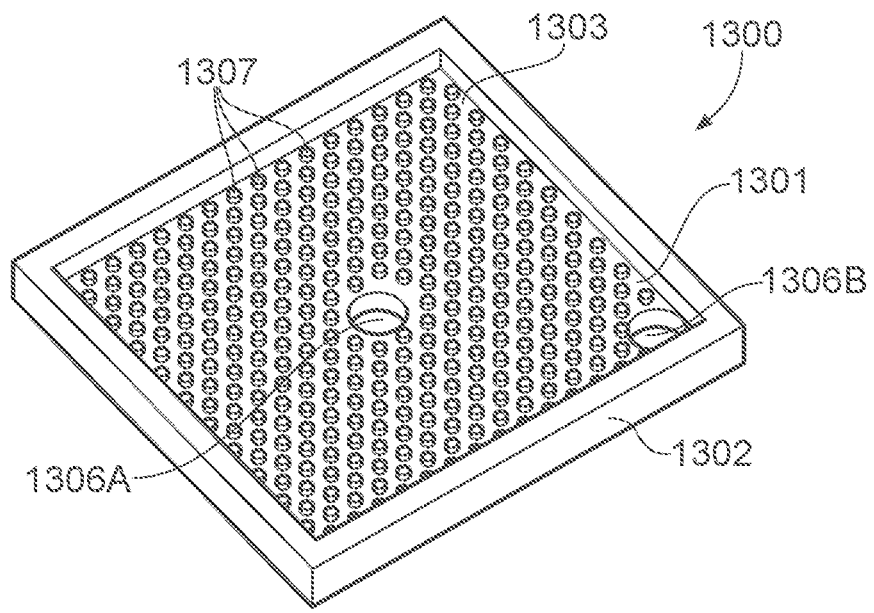
FIG. 21 shows a perspective view of the underside of a cap according to a further embodiment of the disclosure.

FIG. 21 shows a cap in accordance with a further embodiment of this disclosure. In a similar manner to the cap shown in FIG. 3, cap 1300 includes a cover 1301 and a perimeter wall 1302. The cover and perimeter wall define a main recess 1303. Holes 1306A and 1306B are formed in the cover 1301. In this example, the liquid retaining structure is formed from a plurality of pillars 1307. In this example, the pillars are used to push the electrolyte against the die, rather than using a cylinder to hold the electrolyte in place. Each of the pillars is 200 micrometres in diameter, although other diameters could be used, depending on the application. In FIG. 21, there are over 300 pillars, which each protrude by 0.15 mm.

Figure 22:
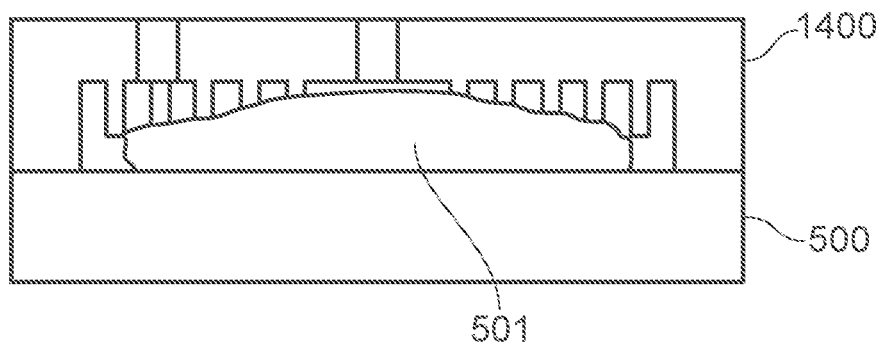
FIG. 22 shows a cross-sectional view of a sensor including a cap according to a further embodiment of the disclosure.

FIG. 22 is an example of a cap in which the pillars have different heights. In particular, those pillars towards the centre of the cap have a smaller height than those pillars towards the edge. In this example, as well as pushing the electrolyte against the die 500, the outer pillars also have the effect of retaining the electrolyte in a central position, and accordingly act in a similar manner to the cylinder shown in the previous embodiments.

Figure 23:
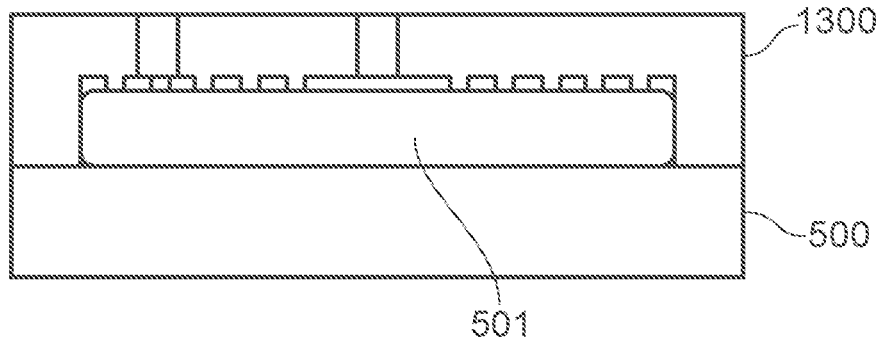
FIG. 23 shows a cross-sectional view of a sensor including a cap according to a further embodiment of the disclosure.

FIG. 23 is an example in which the pillars all have a uniform height. In this example, the pillars simply act to push the electrolyte against the die in a uniform manner. In an alternative embodiment, the pillars may have a non-uniform distribution. For example, the pillars may be denser towards the centre of the cap.

Figure 24:
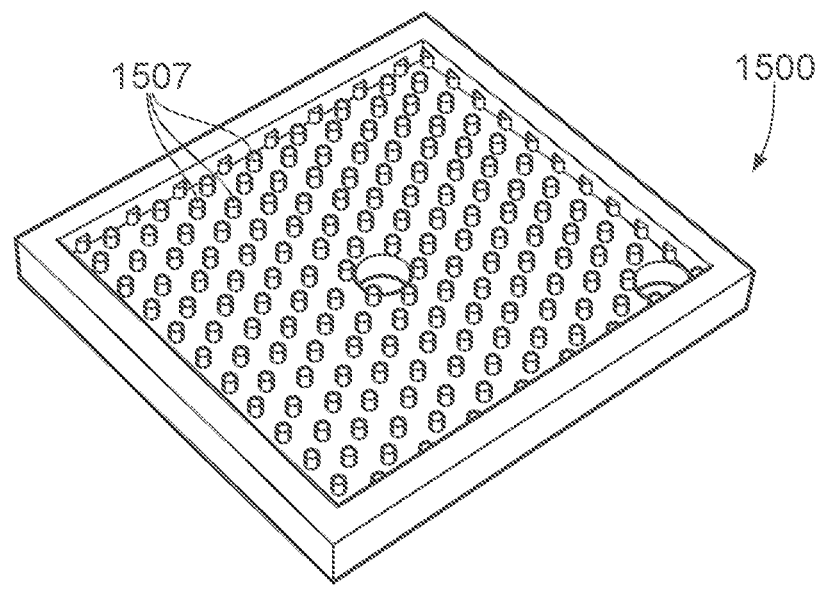
FIG. 24 shows a perspective view of the underside of a cap shown in FIG. 23.

FIG. 24 shows a cap in accordance with a further embodiment in which there are over 180 pillars which each protrude by 0.225 mm.

Figure 25:
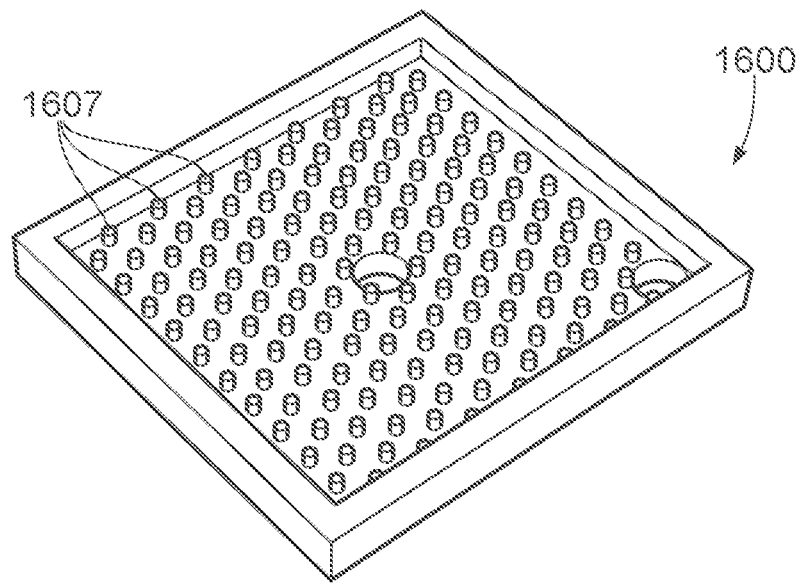
FIG. 25 shows a perspective view of the underside of a cap according to a further embodiment of the disclosure.

In FIG. 25, there are over 155 pillars protruding by 0.3 mm. As can be seen, the number of pillars is inversely proportional to the height of the pillars. However, in alternative embodiments the number of pillars may be directly proportional to the height of the pillars.

FIGS. 26 to 30 show various other cap designs which are all identical, except for the design of the liquid retaining structure. In FIG. 26, the design is similar to that shown in FIG. 3, but rather than providing a full cylinder, four arcuate portions 1704A to 1704D are provided.

FIG. 27 shows a design which also includes arcuate portions 1804A to 1804D, where the length of the arcuate portions is less than that shown in FIG. 26.

FIGS. 28 to 30 all include linear liquid retaining structures. In FIG. 28, there are two linear portions which oppose each other.

In FIG. 29, there is a single linear portion formed in one corner of the cover. In FIG. 30, there are again two linear portions that are longer than the portion shown in FIG. 28. The designs shown in FIGS. 29 and 30 may be easier to manufacture, than the previous designs.

In FIGS. 26 to 30, the retaining structures may extend such that they make contact with the device. This is because the liquid may still expand around the retaining structures in these embodiments.

In embodiments of the disclosure, the cap may be made from standard semiconductor materials such as silicon or glass. The cap, holes and holding structures may be etched using standard lithographic techniques. Alternatively, the cap could be made of other materials such as plastics (for example, ABS, PTFE, Polypropylene, Polyimide), which may be manufactured by, for example, injection moulding or 3D printing.

A method of manufacturing a device in accordance with embodiments of the disclosure will now be described. The device includes a substrate. If the device is a sensor, it may include one or more electrodes. A cap is then placed over the device. As described above, the cap may be made of plastic, ceramic, silicon or glass, amongst other materials. If the cap is made of plastic, it is preferably prefabricated by injection molding. The recess and holes may be formed during the injection molding process. If the cap is made from glass, silicon or ceramic, the cap would typically be fabricated using wafer level processing techniques. For glass or ceramic caps, cavities can be made in the cap by firstly using photolithography to pattern the cap cavity. Then one of, or a combination of, wet etching, dry etching, sand blasting and laser drilling may be used to create the cavities in the cap. For silicon caps, cavities can be made in the cap by firstly using photolithography to pattern the cap cavity. Then one of, or a combination of, wet etching, dry etching, sand blasting, and laser drilling may be used to create the cavities in the cap. The cap is attached to the wafer through wafer bonding (wafer processing) or through placement with epoxy/adhesive on the sensor wafer (single cap placement process). Alternatively, the cap may be attached by other means such as ultrasonics. An electrolyte is dispensed through a cap hole and the hole is sealed.

In the above-described embodiments, cap designs with two to five holes have been described. If the hole is large enough, the same hole could be used for dispensing and venting. As such, designs with a single hole are possible.

In the embodiments described above, various dimensions are described. Each of these is given by way of example only. It will be appreciated that different dimensions will be required depending on the application and liquid.

In the above-described embodiments, a cap having a cover and a wall is described. Other cap arrangements are possible. For example, the cap could be a single concave structure, with retaining structures formed on its underside.

The invention claimed is:

1. A method of manufacturing a device, comprising:
providing a substrate having a first specified area;
attaching a cap to a first surface of the substrate, the cap covering the first specified area, having a retaining structure, formed in a first surface of the cap; and
inserting an electrolyte through a first hole formed in the cap;
wherein the retaining structure is configured to retain the electrolyte in alignment with the first specified area,
wherein the cap defining a first recess and wherein the retaining structure including at least one protrusion formed on and extending away from the first surface of the cap defining a second recess including a portion of the first surface of the substrate within the first recess so that the retaining structure is configured to restrict movement of the electrolyte within a portion of the first specified area defined by the second recess,
wherein the first hole is located inside the second recess;
forming a second hole inside the first recess but outside the second recess; and
venting excess electrolyte using the second hole.

2. The method of claim 1, further comprising:
sealing the first and second holes.

3. The method of claim 1, wherein the at least one protrusion is at least one elongate structure, the at least one elongate structure being elongate along the first surface of the cap.

4. The method of claim 3, wherein the second recess is a substantially circular area or square area.

5. The method of claim 4, wherein the at least one elongate structure is a plurality of elongate structures, each forming a part of the substantially circular area or square area.

6. The method of claim 1, wherein the at least one protrusion is a plurality of protrusions, distributed across the first recess.

7. The method of claim 6, wherein the plurality of protrusions are pillars.

8. The method of claim 1, wherein the at least one protrusion is a cylindrical wall.

9. The method of claim 8, wherein the at least one protrusion is a plurality of protrusions, and each protrusion forms part of the cylindrical wall.

10. The method of claim 1, wherein the cap comprises a perimeter wall and a cover, and the retaining structure is formed with the perimeter wall.

11. The method of claim 10, wherein the at least one protrusion has a height which is less than that of the perimeter wall, such that, in use, the at least one protrusion does not make contact with the substrate.

12. The method of claim 1, wherein the device is a sensor.

13. A method of manufacturing an electronic device with a cap, comprising:
attaching the cap to a first surface of an electronic device substrate having a first specified area, wherein the cap including a cap structure defining a first recess and a retaining structure comprising a plurality of pillars formed on and extending away from a first surface of the cap structure and distributed across the first recess defining a second recess including a portion of the first surface of the electronic device substrate within the first recess;
forming a plurality of holes, wherein a first hole of the plurality of holes is located inside the second recess and a second hole of the plurality holes is located inside the first recess but outside the second recess;
inserting an electrolyte using the first hole, wherein the second hole is used for venting excess electrolyte;
restricting movement of the electrolyte to the second recess using the retaining structure to within a portion of the first specified area defined by the second recess; and
sealing the plurality of holes.

14. The method of claim 13, wherein sealing the plurality of holes includes plugging the plurality of holes.

15. The method of claim 13, wherein a third hole of the plurality of holes located inside the first recess but outside the second recess, wherein the first hole is located between the second and third holes, wherein the second and third holes are used for venting excess electrolyte.

16. The method of claim 13, wherein a first spacing of the plurality of pillars at a center of the cap is denser compared to a second spacing of the plurality of pillars at a perimeter of the cap.

17. The method of claim 13, wherein the electronic device is a sensor.

* * * * *